INVENTORS
George D. McGoogan
and John P. Jones
BY *Williams and Kesske*
ATTORNEYS

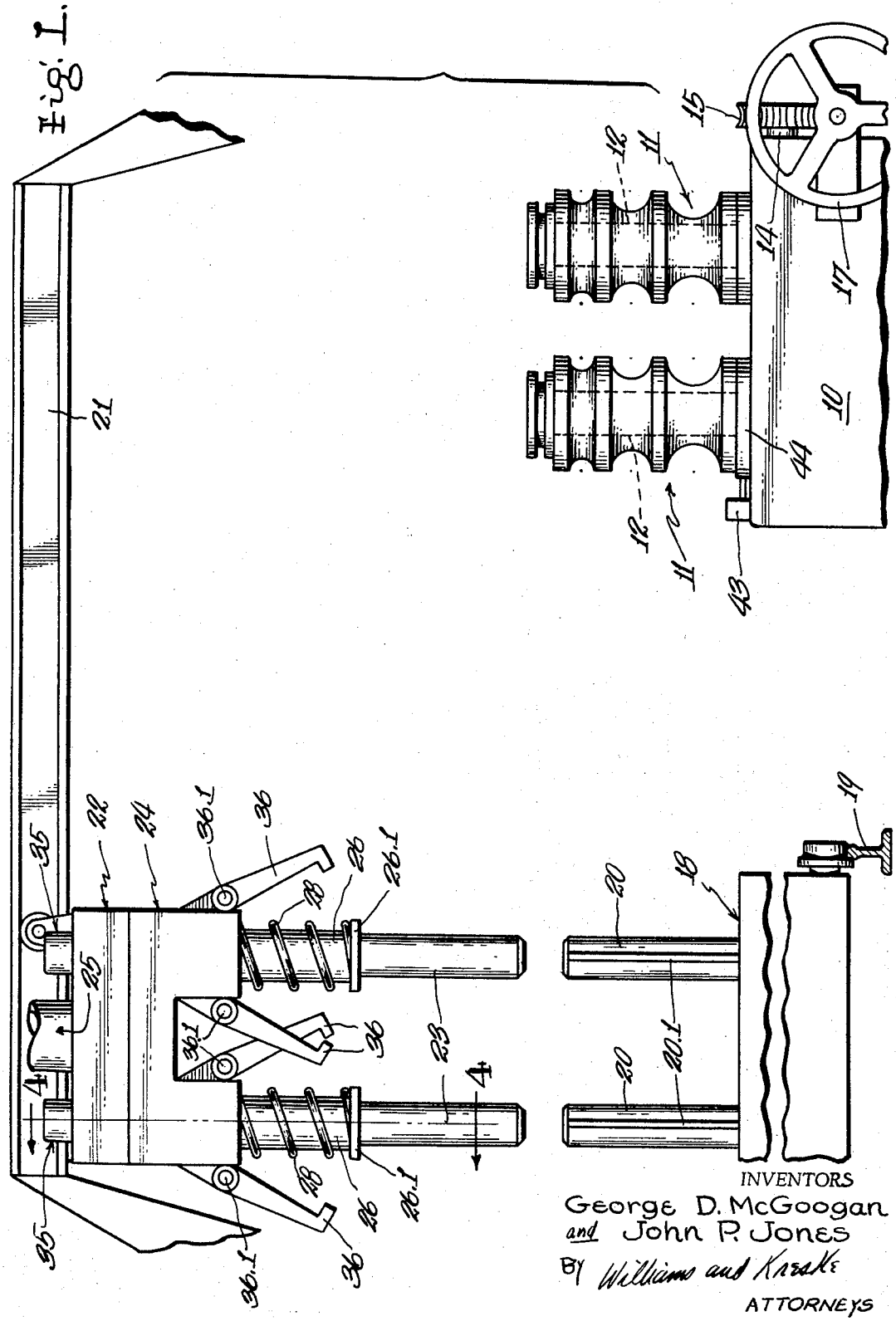

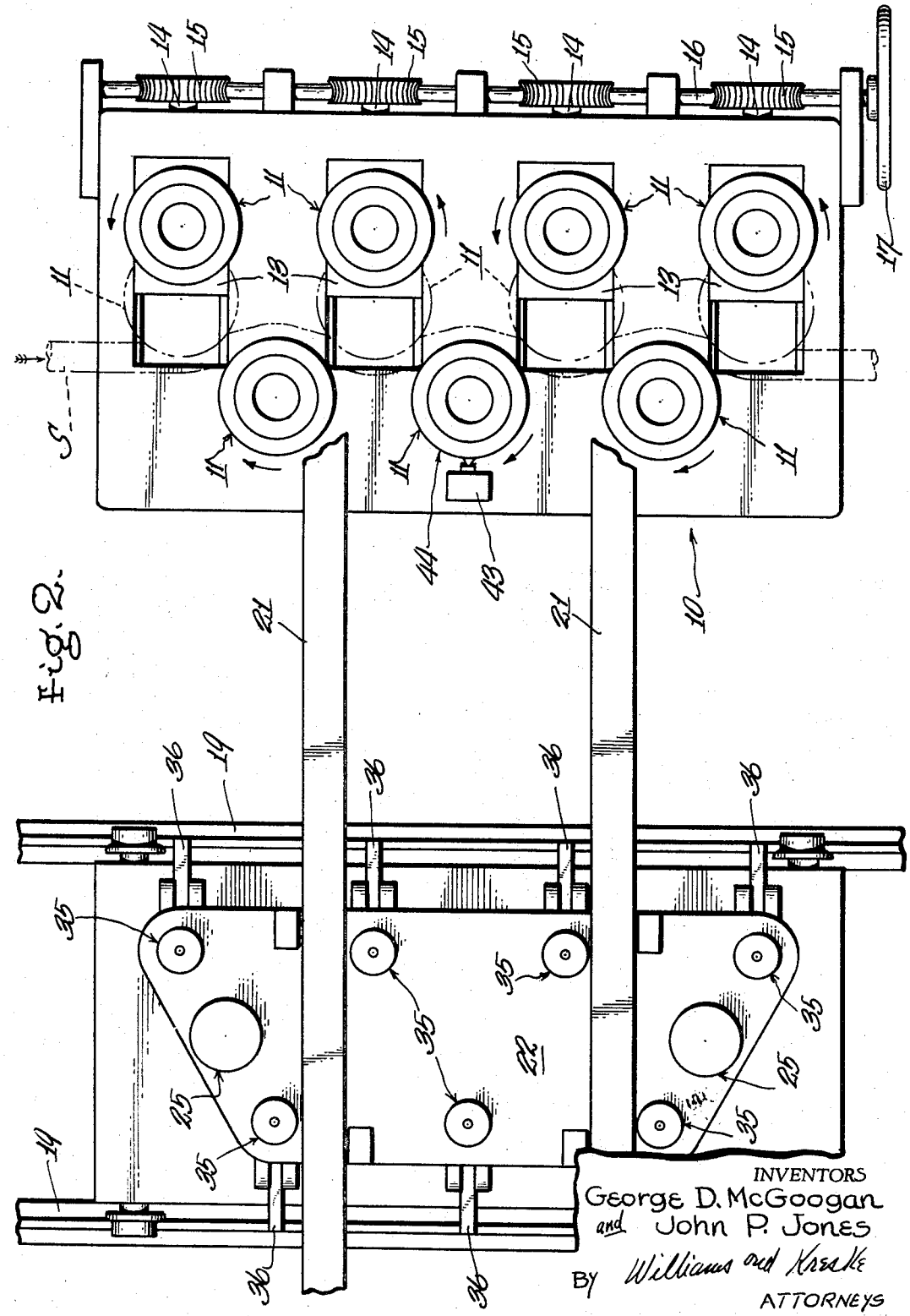

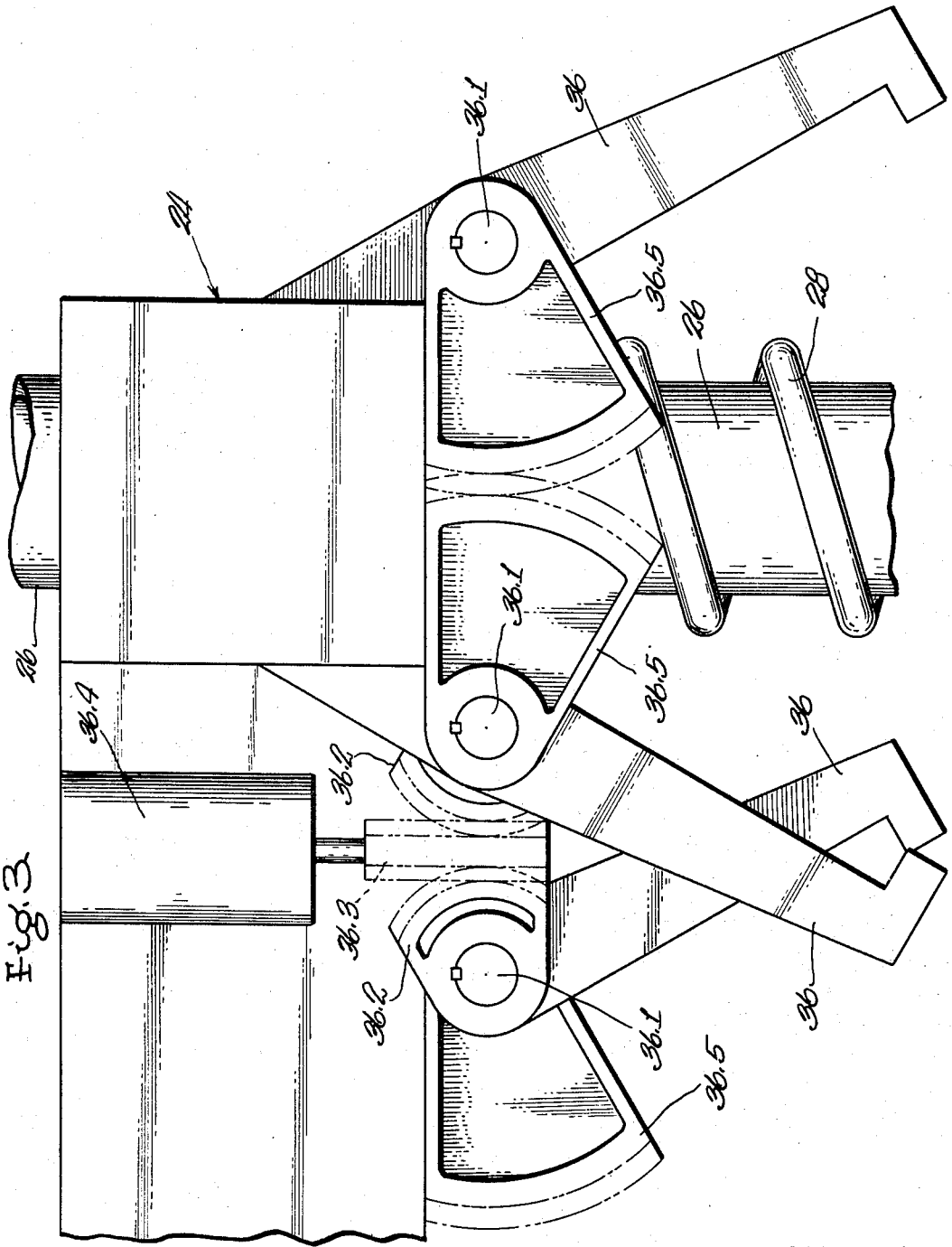

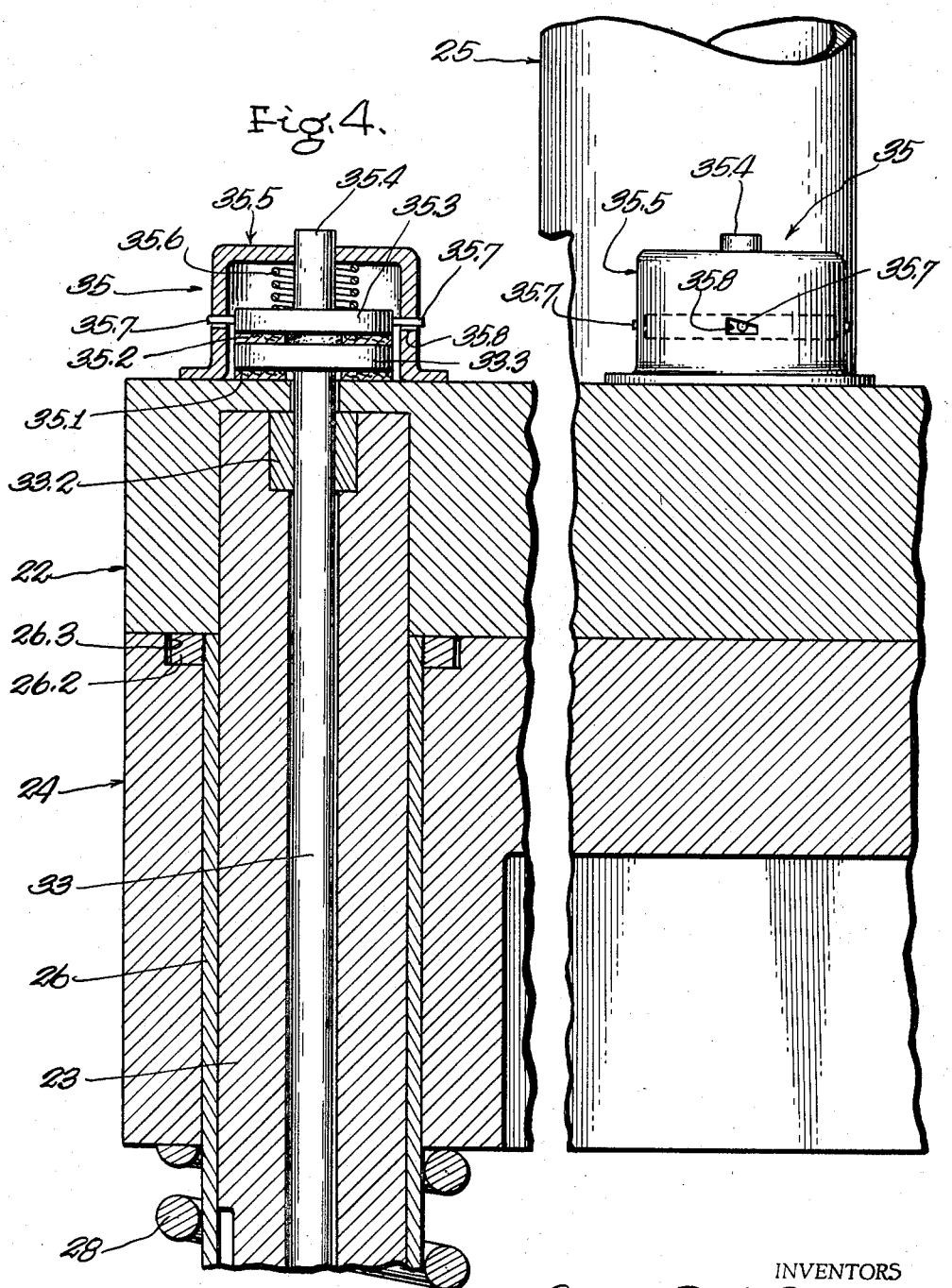

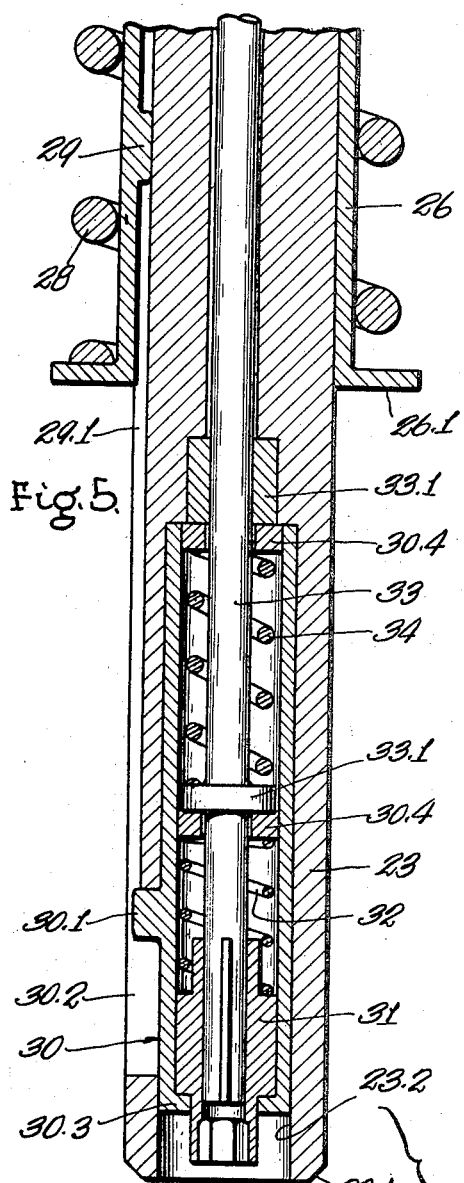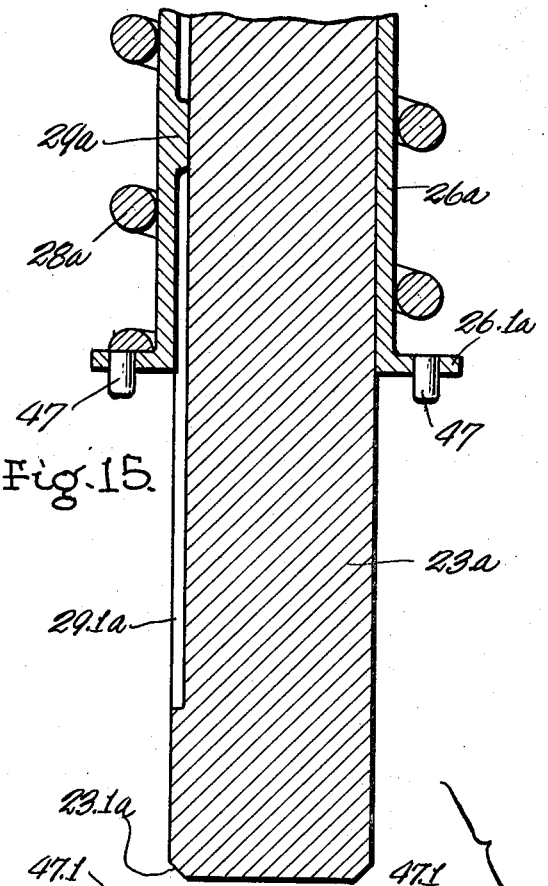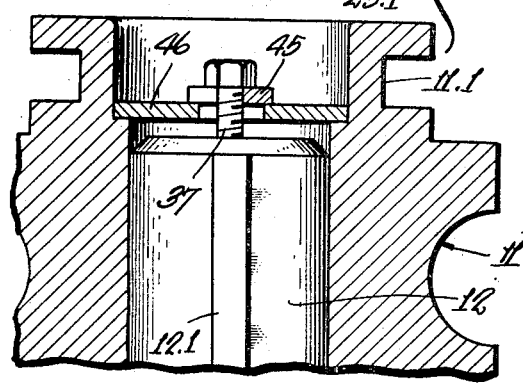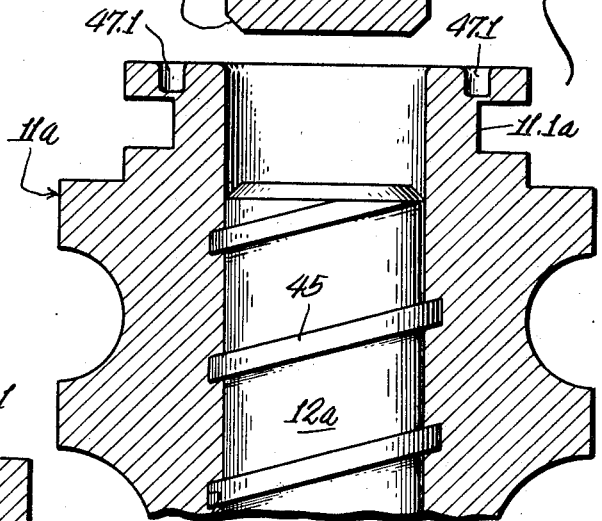

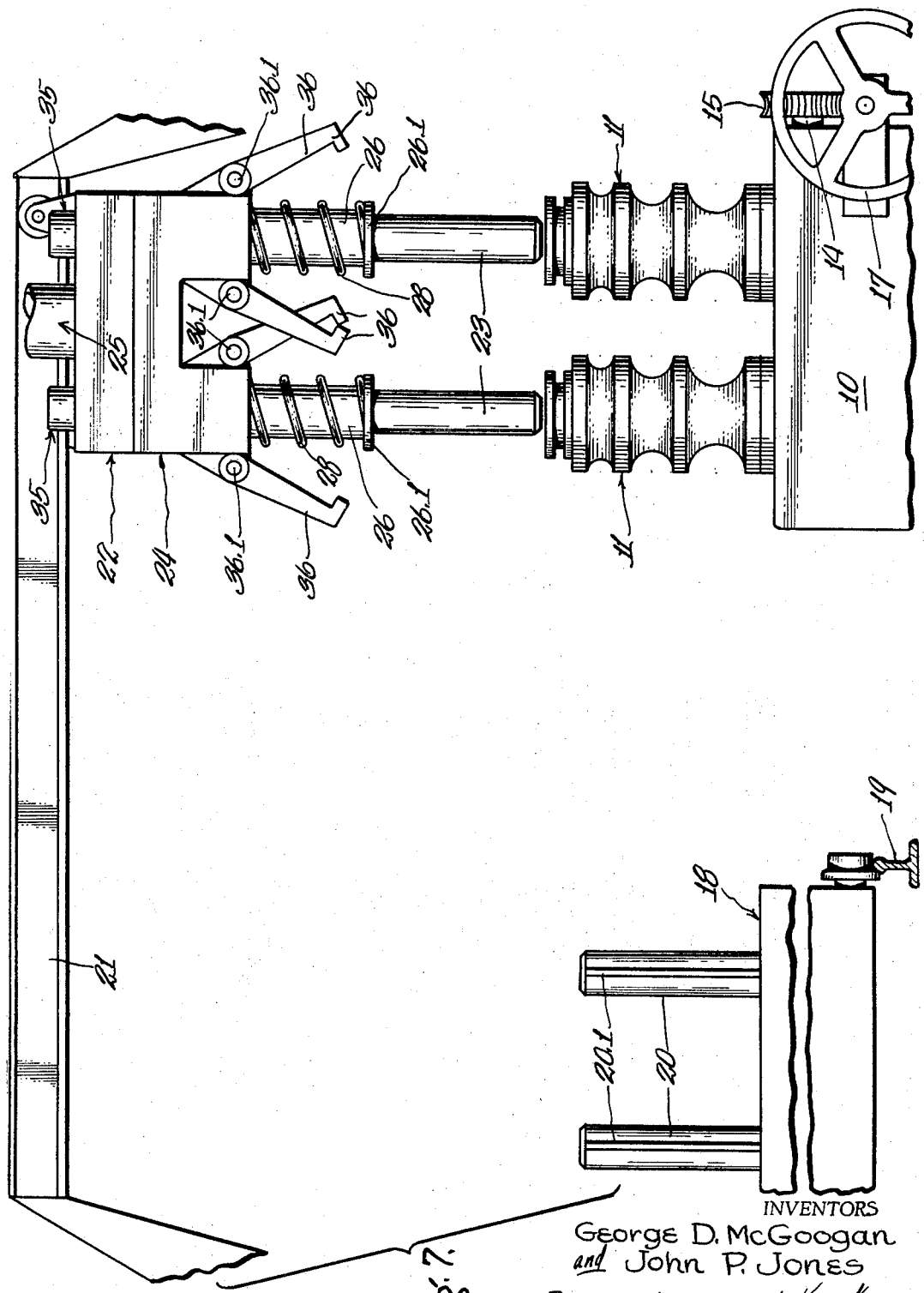

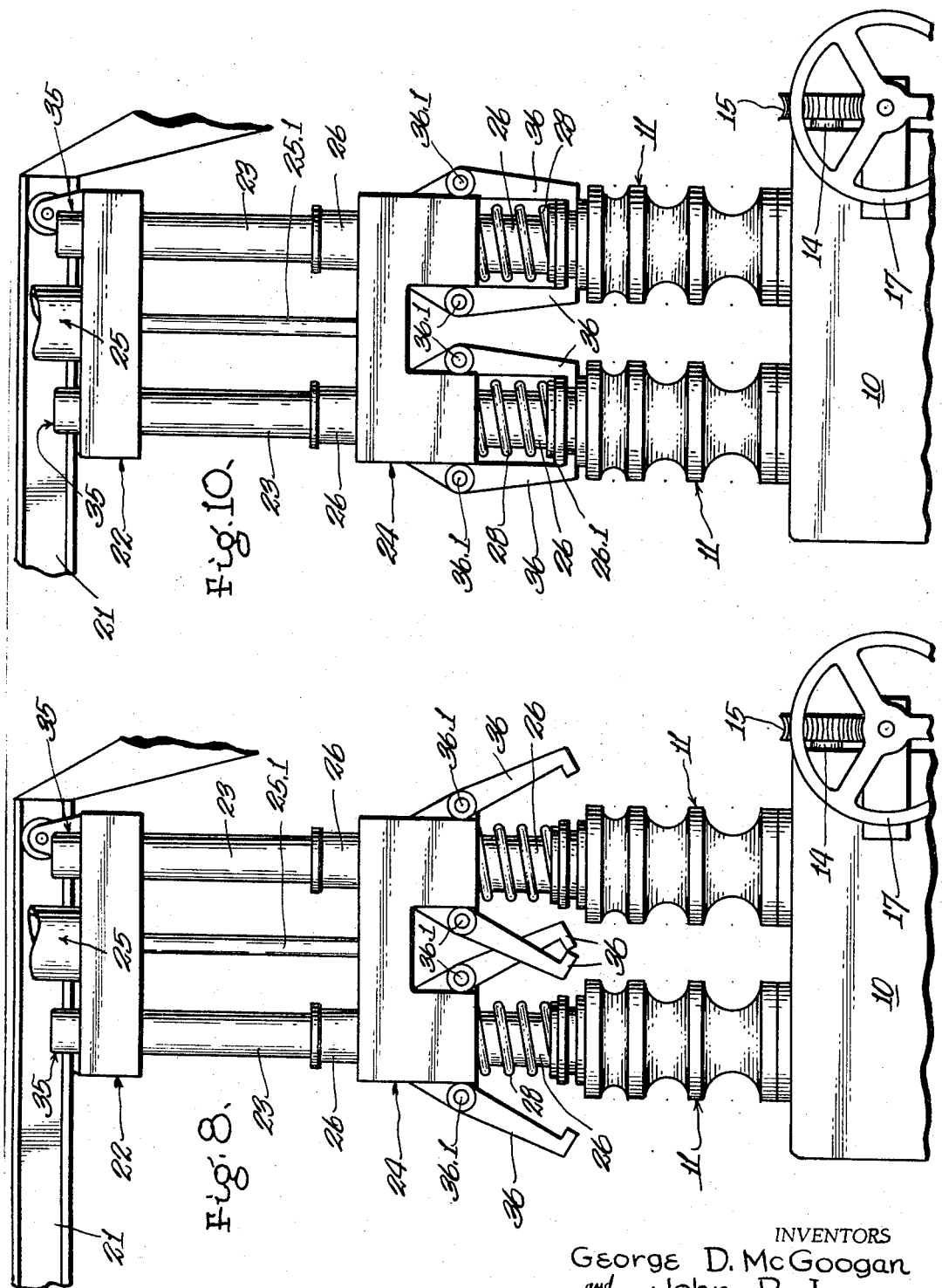

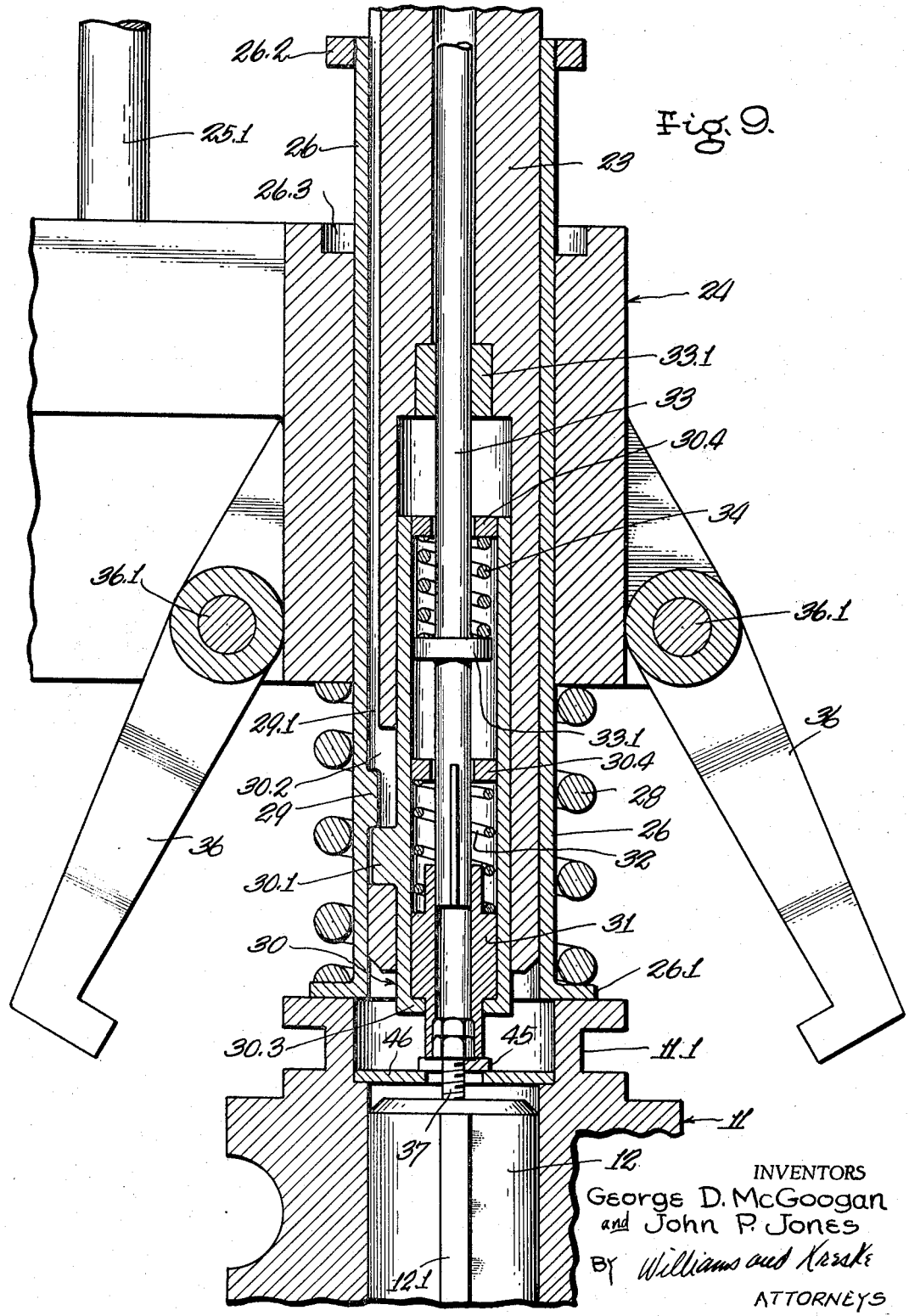

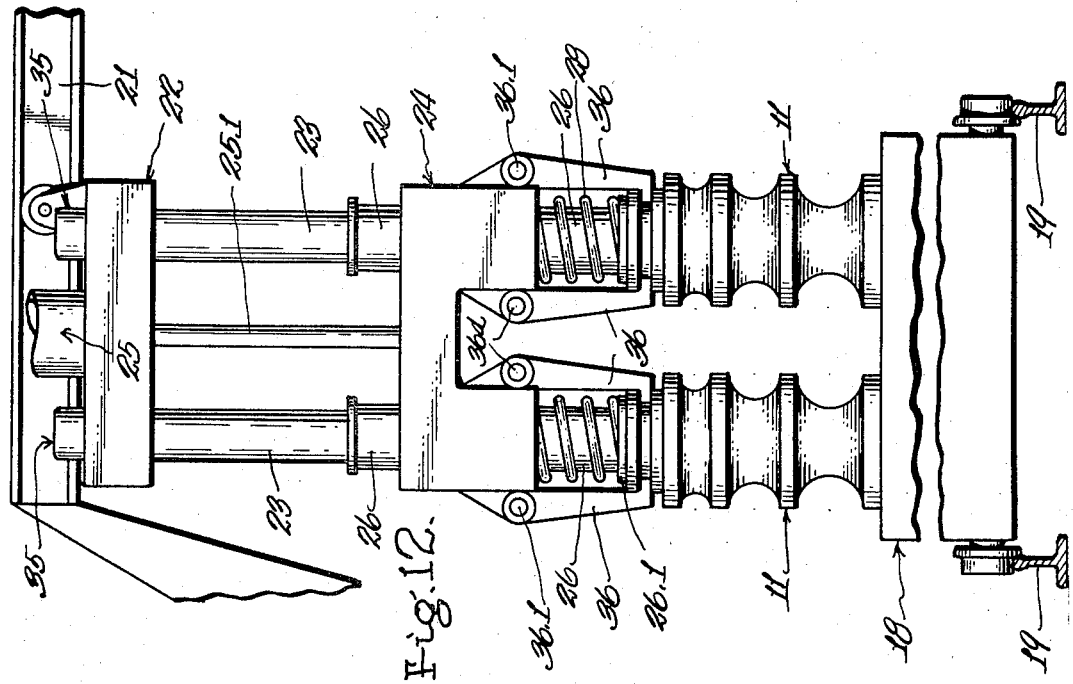
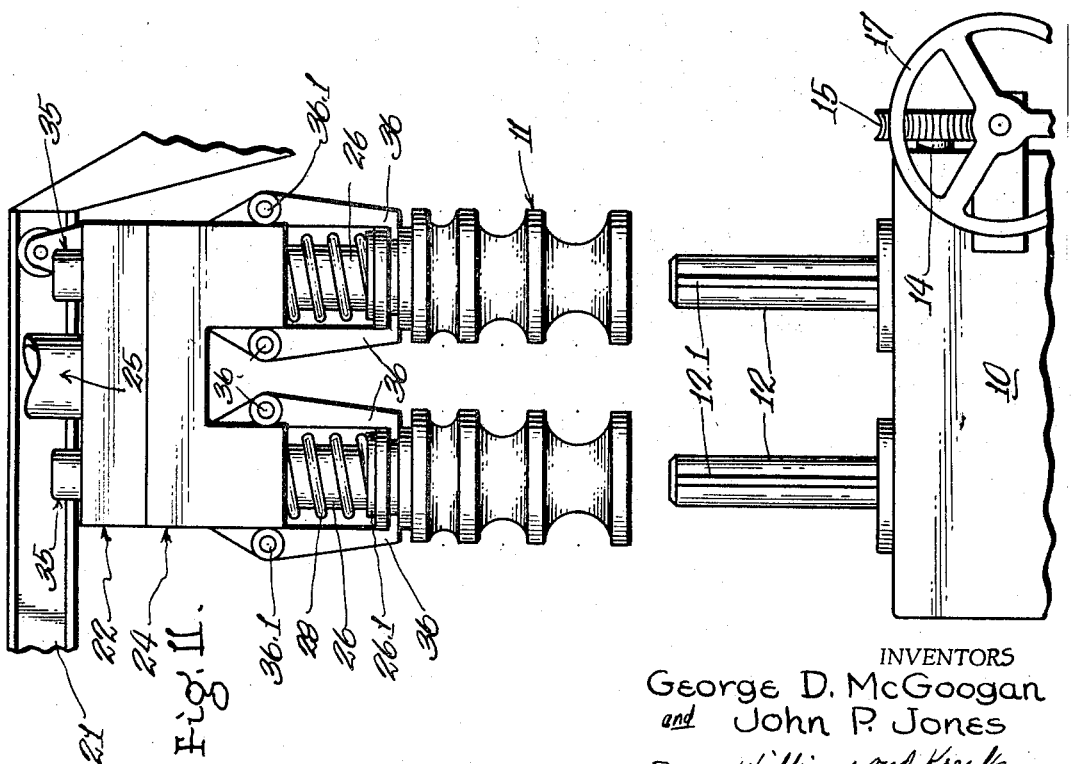

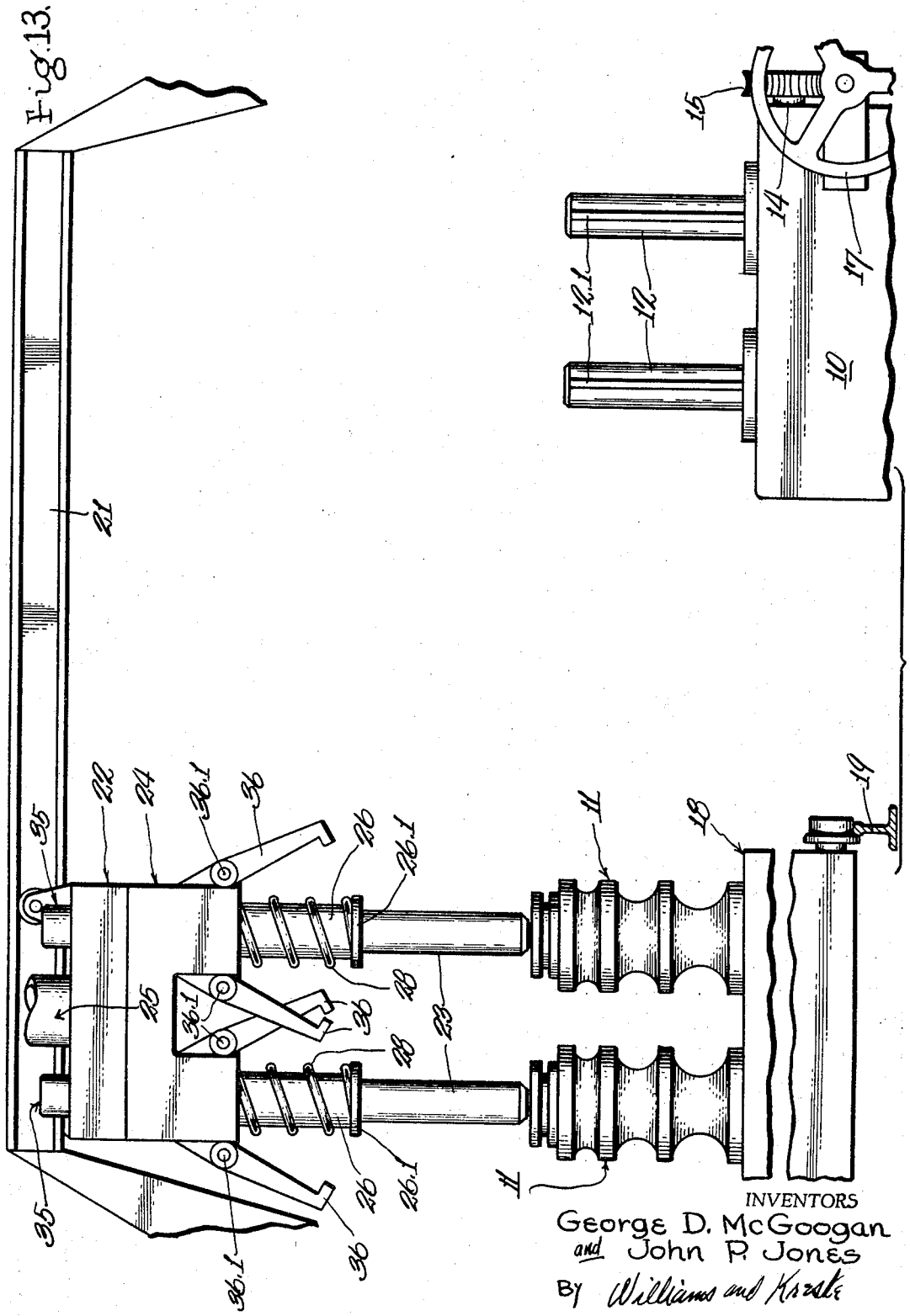

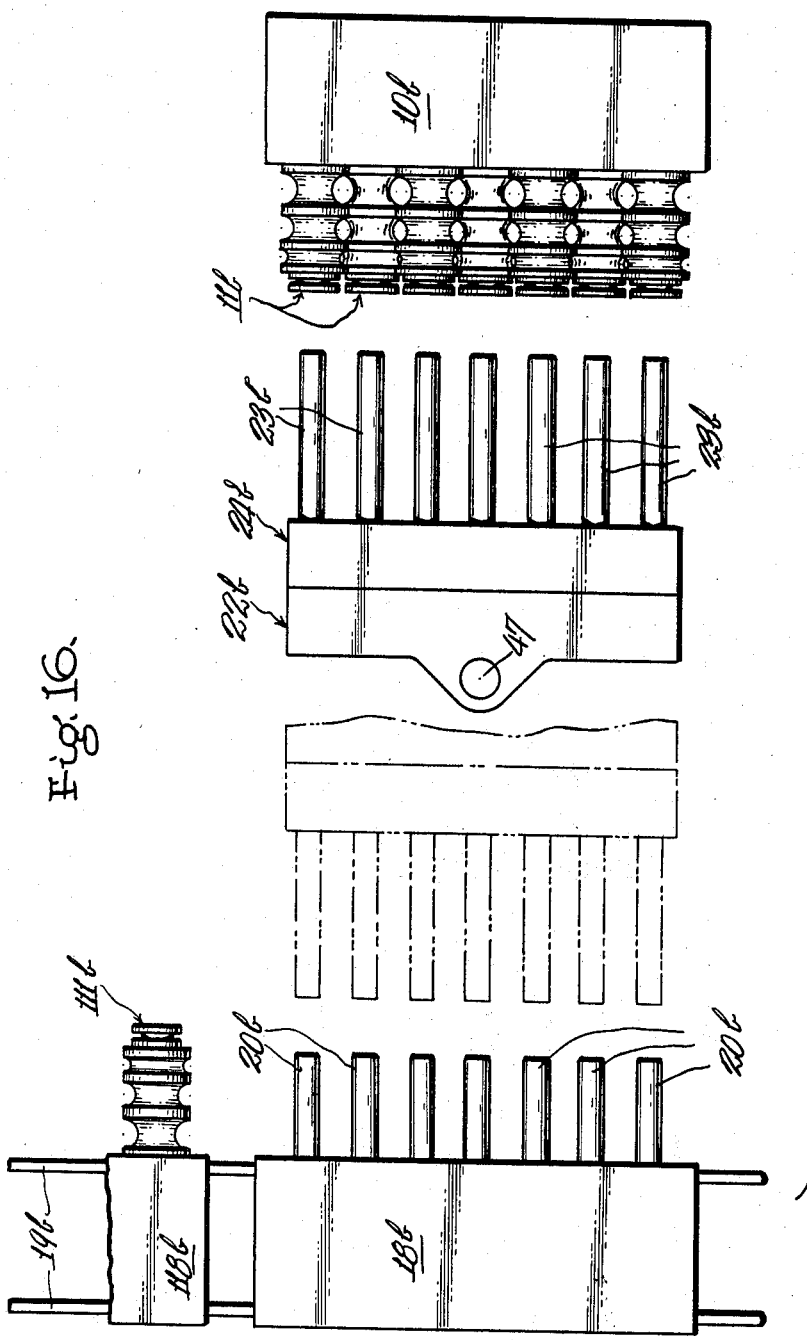

United States Patent Office 3,425,256
Patented Feb. 4, 1969

3,425,256
METHODS OF AND APPARATUS FOR MANIPULATING ROLLS OF MULTIPLE ROLL APPARATUS
George D. McGoogan and John P. Jones, Youngstown, Ohio, assignors to The McKay Machine Company, Youngstown, Ohio
Filed Dec. 20, 1965, Ser. No. 515,078
U.S. Cl. 72—239                  10 Claims
Int. Cl. B21b *31/10;* B60b *7/06;* B30b *3/00*

ABSTRACT OF THE DISCLOSURE

Method and apparatus for manipulating the rolls of devices having a set of rolls arranged on respective spindles in laterally spaced relation and in practising the method, the set of device rolls are transferred en masse from respective device spindles to storage in the same spaced relation as they were when assembled with respective device spindles. A set of replacement rolls, which are stored in the same spaced relation as the device rolls, are then transferred en masse to respective device spindles.

---

The present invention relates to manipulating apparatus, more particularly to apparatus and methods of manipulating the multiple rolls of rolling or straightening mills, and the principal object of the invention is to provide new and improved methods and apparatus of the character described.

In rolling apparatus for elongated material, it is common practice to utilize forming and/or straigthening mills having a plurality of rolls, mounted on respective shafts, arranged in a pattern to provide a pass for the material.

When the material being processed is other than flat strip, the rolls will have a contour complementary to the cross-sectional shape of the material. In cross-section, the material may, for example, be round, square, triangular, channel-shaped, or the like, and as mentioned, the rolls are contoured complementary to the material. Not only must the rolls be complementarily contoured, they must also be sized for different material sizes of the same cross-sectional shape. Thus, the rolls must have a different contour (at least different in size) when, for example, round material one inch in diameter is being processed than they do when processing round material two inches in diameter.

From the foregoing, it will be evident that when a different shape or size of material is to be processed, the mill rolls must be changed. When there are a considerable number of rolls, as frequently occurs, and when such rolls are large and heavy, the roll changing operation can become extremely cumbersome and time-consuming. For example, at the present time, it is not unusual for a crew to require several hours to change the many rolls on a large mill. During the roll-changing operation, of course, the mill must be shut down and is thus totally unproductive.

By use of the present invention, any number of rolls may be removed from a mill and replaced by other rolls in but a few moments' time and by a single operator. The present invention thus not only results in many manhours saved each time the rolls of a mill must be changed, but also results in virtually uninterrupted production of the mill since shut-down time is limited to but a few moments. These and other advantages will readily become apparent from a study of the following description and from the appended drawings.

In the drawings accompanying this specification and forming a part of this application, there is shown, for purpose of illustration, embodiments which the invention may assume, and in these drawings:

FIGURE 1 is a fragmentary, front elevational view of apparatus embodying the present invention, FIGURE 2 is a fragmentary top plan view of the apparatus seen in FIGURE 1, FIGURE 3 is an enlarged, fragmentary, rear elevational view of part of the apparatus seen in FIGURE 1, FIGURE 4 is an enlarged, fragmentary sectional view generally corresponding to the line 4—4 of FIGURE 1, FIGURE 5 is an enlarged fragmentary sectional view of certain details, FIGURE 6 is a diagrammatic view of an electrical control circuit for the apparatus herein disclosed, FIGURES 7 and 8 are views similar to FIGURE 1 but showing certain parts in other positions, FIGURE 9 is an enlarged, fragmentary sectional view of the details seen in FIGURE 5 but in another position, FIGURES 10, 11, 12, and 13 are views similar to FIGURES 1, 7, and 8 but showing certain parts in still other positions, FIGURE 14 is a fragmentary, reduced size plan view similar to FIGURE 2 but with certain overlying parts removed in the interest of clarity.

FIGURE 15 is a view similar to FIGURE 5, but of still another embodiment, and

FIGURE 16 is a fragmentary, top plan view of still another embodiment of the invention.

Figure 14:
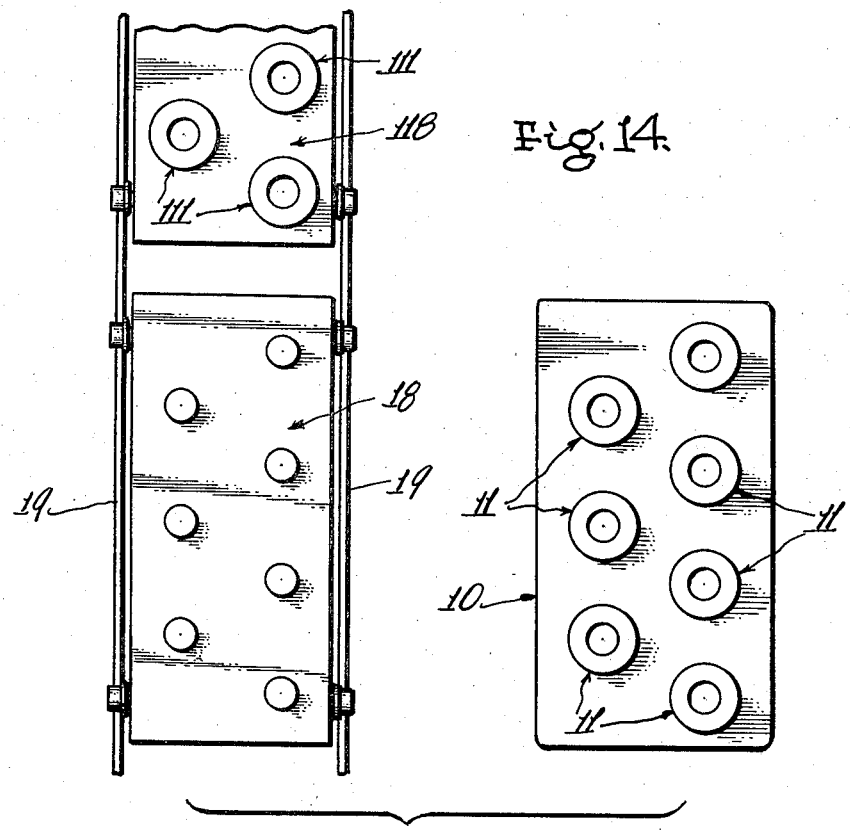

With reference first to FIGURES 1 and 2, there is shown a mill 10 of any conventional design herein shown providing a plurality of upright rolls 11. Rolls 11 are supported on suitable shafts 12 later to be described in greater detail, such rolls forming a pass for the elongated material S to be processed. For purpose of illustration, mill 10 will be considered a straightening mill which causes the material to traverse an undulating path for the purpose of straightening the material. Rolls 11 are thus arranged in conventional opposed but off-set relation and as seen in FIGURE 2, the three rolls on the left are opposed by four rolls on the right which are off-set from the rolls on the left in a direction longitudinally of the material.

Still referring to FIGURE 2, the rolls on the left are fixedly mounted while the rolls on the right are mounted on slides 13 for movement toward and away from the rolls on the left to thus vary the spacing therebetween as required for different materials being processed. As seen in full lines, the rolls on the right are spaced away from the rolls on the left in a non-working position. Such rolls, however, are shown in phantom lines in position to process the material S disposed therebetween. Any suitable means may be employed for simultaneously shifting the rolls on the right between their full and phantom line positions and as herein shown, threaded adjusting shafts 14 are connected to each slide 13 and each have a worm gear 15 secured thereto. A rotatably supported adjusting shaft 16 has an adjusting wheel 17 mounted thereon and carries worms engaged with respective worm gears 15. The arrangement is such that rotation of the adjusting wheel 17 in one direction simultaneously moves the right-hand rolls 11 from their full line positions to their phantom line positions and rotation of the adjusting wheel in the opposite direction simultaneously returns the right-hand rolls to their full line positions.

Although not shown, any conventional drive mechanism will be employed to effect simultaneous rotation of the rolls 11 in the directions indicated and when so rotated, the elongated material S will be driven through the undulating pass provided by the rolls 11 in the direction shown by the arrow.

As best seen in FIGURE 1, each roll 11 is herein shown to have three different sized grooves therein for accommodating a respective material size. Thus, three different sizes of material can be processed without changing rolls.

When, however, the rolls must be changed because the material to be processed cannot be accommodated by the rolls presently on the mill 10, the apparatus and method next to be described will be employed. Briefly, apparatus is provided for removing the set of rolls no longer needed from the mill, for transferring such rolls away from the mill to a place of storage, for transfering a set of rolls next to be used from a place of storage to the mill and installing the new rolls on the mill.

As best seen in FIGURE 1, a wheeled cart 18 is disposed to one side of the mill 10 and is movable along rails 19 for a purpose to appear. Projecting upwardly of the cart 18, are a plurality of spindles 20. It is an important feature of the present invention that the spindles 20 are arranged in precisely the same pattern as the mill shafts 12 on which the rolls 11 are mounted when such shafts are positioned as seen in FIGURE 1.

Spanning the cart 18 and the mill 10 is an overhead rail structure formed of a pair of rails 21 in spaced, side-by-side relation. Suspended beneath the rails 21 for movement therealong between the positions seen in FIGURES 1 and 7 is a carriage 22 from which depend a plurality of pins 23. Pins 23, in this embodiment, are suitably anchored in the carriage 22 and are arranged in the same pattern as the spindles 20 and the mill shafts 12 for reasons to appear.

Mounted beneath the carriage 22 for movement therewith is a head 24 which is vertically slidable along the pins 23 between the positions seen in FIGURES 7 and 8. Any suitable means may be employed for raising and lowering the head 24 as required and at the present time, carriage 22 mounts fluid cylinders 25 whose piston rods 25.1 are anchored to the head.

As best seen in FIGURES 4 and 5, elongated sleeves 26, each with an integral lower flange 26.1 and a removable upper flange 26.2 are slidable on the exterior of respective pins 24. Sleeves 26 are in turn slidable in bores 27 in the head 24, the upper sleeve flanges 26.2 being receivable within respective recesses 26.3 in the head. A relatively heavy compression spring 28 surrounds each sleeve 26 and is interposed between the latter's lower flange 26.1 and the underside of the head to urge the sleeves to the position seen in FIGURES 1, 4, and 5, wherein they project downwardly as far as possible from the head 24. In order to prevent rotation of the sleeves 26 and for a purpose later to appear, each sleeve has an integral key 29 slidable in a keyway 29.1 formed in respective pins 23.

For a purpose to appear and referring to FIGURE 5, the lower end of each pin 23 is externally chambered at 23.1 and each is provided with an internal recess 23.2 in which a tubular member 30 is slidable. Member 30 has an integral key 30.1 which fits within a slot 30.2 formed in the pin 23 in part co-extensive with and overlapping the lower end of the keyway 29.1. Slidable within the lower end of the tubular member 30 is a socket member 31 which is prevented from escaping from the lower end of the tubular member by an inwardly turned flange 30.3 on the latter which engages a shoulder of the socket. A compression spring 32 is interposed between the socket 31 and an internal abutment 30.4 carried by the tubular member 30 for resiliently urging the socket 31 to position against the member flange 30.3.

Still referring to FIGURE 5, a shaft 33 is rotatably carried by each pin 23 and has its lower end keyed to respective sockets 31 for unitary rotation therewith. As will appear, however, each socket 31 is slidable longitudinally of its shaft 33, notwithstanding its unitary rotation therewith. Each shaft 33 is provided with an integral collar 33.1 within the tubular member 30 and a compression spring 34 is interposed between the shaft collar 33.1 and an abutment 30.4 at the upper end of the tubular member 30 to resiliently urge the tubular member and the parts supported thereby to the uppermost position shown whereby in the socket 30 is retracted wholly within the lower end of the pin 23.

Each shaft 33 is journalled on a lower bushing 33.1 and an upper bushing 33.2, see FIGURE 4, and the upper end of each shaft is provided with a radially enlarged shoulder 33.3 disposed at the top of the carriage 22. For reasons later to appear, each shaft collar 33.3 forms part of respective friction clutch assemblies 35 next to be described.

Each friction clutch assembly 35 presently comprises a lower ring of friction material 35.1 anchored to the carriage 22 and an upper ring of friction material 35.2 anchored to the lower face of a disk 35.3. Disk 35.3 is disposed above and concentric with the shaft collar 33.3 and has an axial extension 35.4 rotatably carried by the base of an inverted, cup-like housing 35.5 suitably secured to the upper surface of the carriage 22. A compression spring 35.6 is interposed between the bottom of the housing 35.5 and the disk 35.3 to urge the latter in a direction to clamp the shaft collar 33.3 between the two friction rings 35.1, 35.2.

Means are provided for limiting rotation of the disk 35.3 and as herein disclosed, the latter is provided with a plurality of radially outwardly extended pins 35.7 projecting through respective slots 35.8 in the housing 35.5. For a purpose to appear, the upper portion of each slot 35.8 is inclined to provide a wedge surface. In one attempted direction of rotation of the shaft 33, disk 35.3 will rotate in a direction to move the disk pins 35.7 toward the narrow ends of their slots 35.8. This will force the disk 35.3 toward the shaft collar 33.3 and, by wedging action of the slot, will lock the shaft collar and thus the shaft 33 against rotation.

On the other hand, attempted rotation of the shaft 33 in the opposite direction will rotate the disk 35.3 in a direction to move the disk pins 35.7 toward the wide ends of their slots. Since the only force now urging the disk toward the shaft collar is the spring 35.6, the frictional force locking the shaft 33 against rotation will be a function of the frictional characteristics of the frictional rings 35.1, 35.2, and the force exerted by the spring 35.6.

From the foregoing, it will be evident that the friction clutch assemblies 35 will positively prevent rotation of respective shafts 33 in one direction of rotation but will resiliently restrict their rotation in the opposite direction of rotation. Assemblies 35 thus combine the functions of a one-way clutch and an overload clutch.

Referring once again to FIGURE 1, the previously mentioned head 24 carried by the carriage 22 mounts a pair of opposed hook-like members 36 adjacent each pin 23. Members 36 are secured to respective pivot shafts 36.1 for pivotal movement therewith between the positions seen in FIGURE 1 and the positions seen in FIGURE 10 for reasons to appear. As will be understood, all of the members 36 on a respective side of a row of pins 23 are in aligned relation and are secured to the same pivot shaft 36.1.

Turning now to FIGURE 3, the means for effecting pivotal movement of the members 36 presently comprises a pair of gear segments 36.2 carried by the inner pair of pivot shafts 36.1 and meshing with a rack 36.3 on the piston rod of a fluid cylinder 36.4 mounted on the head 24. Gear segments 36.5 interconnect each of the inner pivot shafts 36.1 with a respective adjoining outer pivot shaft 36.1, the arrangement being such that all of the pivot shafts 36.1 and thus the members 36 are interconnected for unitary movement between the positions hereinabove mentioned.

During normal operation of the mill 10, carriage 22 will be in the position seen in FIGURES 1 and 2, with the head 24 elevated and with the hook-like members 36 in the position seen in FIGURE 1. During such normal operation, the right-hand rolls 11 will move to the left to working relation with the left-hand rolls 11 as previously described. When, however, the mill rolls 11 are to be removed from the mill shafts 12, right-hand rolls 11 will be shifted away from the left-hand rolls 11 to the position seen in FIGURE 1.

Carriage 22, along with its head 24 and its pins 23, may now be shifted by any suitable means from the position seen in FIGURE 1 wherein the carriage pins 23 are aligned with respective cart spindles to the position seen in FIGURES 5 and 7 wherein the carriage pins 23 are aligned with respective mill shafts 12. Following disposition of the carriage 22 in the position of FIGURE 7, head 24 will be lowered by its cylinder 25 to the position seen in FIGURES 8 and 9.

With reference to the latter figure, lowering of head 24 will simultaneously lower the sleeves 26 until their keys 29 engage the keys 30.1 of respective tubular members 30. Further downward movement of the sleeves with the head will lower the tubular members to the position of FIGURE 9 wherein the socket members 31 are engaged with the heads of respective capscrews 37 threaded into the ends of respective mill shafts 12. Upon abutment of the sleeve flanges 26.1 with respective rolls 11, downward movement of the sleeves will be arrested; however, downward movement of the head to the position of FIGURE 9 will continue, respective springs 28 being compressed in the process of such further downward movement.

Figure 6:
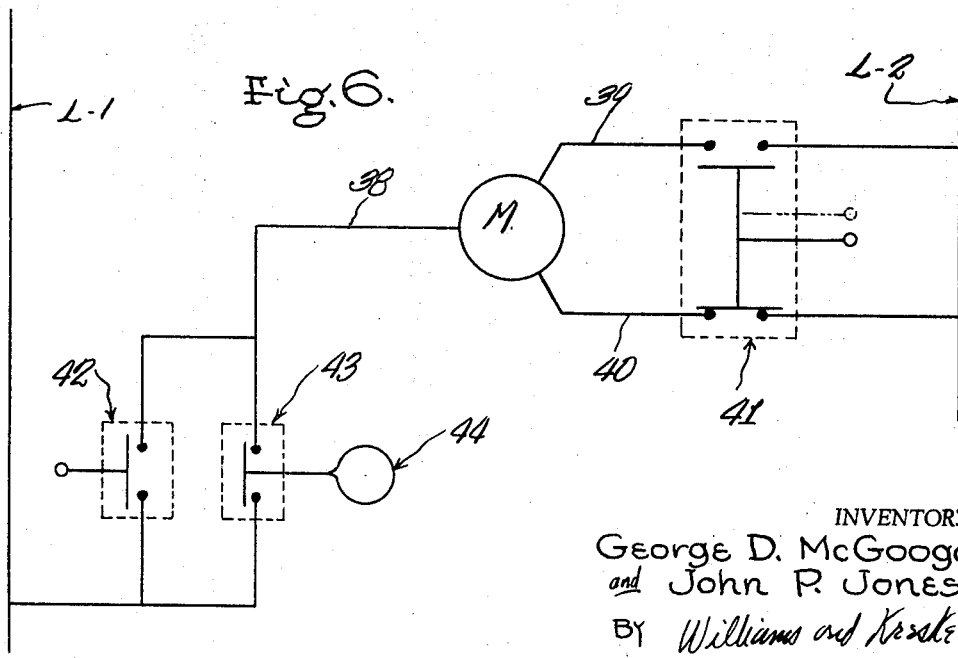

With the parts positioned as seen in FIGURE 9, mill shafts 12 may now be rotated through a control circuit seen in FIGURE 6 to loosen respective capscrews 37. As viewed in FIGURE 6, a jogging drive motor M will preferably be connected to the mill spindles 12 to effect their simultaneous rotation at relatively low speed. Such motor will preferably be reversible, having a common circuit 38 connected to a power line L–1 and circuits 39 and 40 connected to a power line L–2. Circuits 39 and 40 pass through a double-pole, double-through selector switch 41, circuit 39 hereinafter being referred to as the loosening circuit and 40 being referred to as the tightening circuit according to their function in rotating the mill spindles. Interposed in the common circuit 38 is a normally open start switch 42 and shunted around the start switch is a normally closed limit switch 43 whose actuator bears against a cam 44 formed on one of the mill shafts 12 (see also FIGURES 1 and 2). The lobe of cam 44 functions to interrupt the shunt circuit about the switch 42 with each revolution of the mill shafts 12, such interruption occurring, as will be understood, when such shafts are in a predetermined rotational position. Normally, of course, the circuits seen in FIGURE 6 will be de-energized while the mill is operating to straighten stock and will only be operable when the rolls 11 are to be removed from the mill shafts.

With the parts positioned as seen in FIGURES 9 and 6, it will be noted that cam 44 is holding open the contacts of switch 43 whereby motor M is de-energized. The actuator of selector switch 41 will now be shifted from its full-line position to its phantom-line position to open the tightening circuit 40 and close the loosening circuit 39. Start switch 42 will now be manually closed to complete the common circuit 38 and thus energize motor M to drive the mill shafts in a direction to loosen the capscrews engaged by respective sockets 31. Sockets 31 will be held against rotation by means of the clutch assemblies 35 previously described, the latter, in this direction of rotation, positively preventing rotation of the shafts 33 to which the sockets 31 are keyed.

After the mill shafts have been rotated by motor M a sufficient number of turns to insure adequate loosening of the capscrews 37, start switch 42 will be released. Mill shafts 12 will, however, continue to rotate in the same loosening direction until the lobe of cam 44 opens switch 43 to thus de-energize motor M and stop the mill shafts in the predetermined rotational position wherein their keys 12.1, for example, are in the position seen in FIGURE 9.

In the event any of the sockets 31 fail to properly engage their capscrews 37 upon lowering of the the head 24 as previously described, their springs 32 will be compressed and as soon as the spindles have been rotated as above-described an amount sufficient to align the capscrew with the socket, latter will be forced into position upon the capscrew by such spring.

With the capscrews 37 loosened as hereinabove described, the head 24 will be once again elevated to the position seen in FIGURE 7. The operator may then reach into the rolls 11 and withdraw both the small, slotted washer 45 underlying the head of each capscrew 37 and the larger, apertured washer 46 seated against a shoulder in respective rolls. If necessary, the carriage may be shifted along the rails 21 away from the mill a short distance to provide greater accessibility for removing the washers 45, 46.

With the washers 45, 46 removed from each roll 11, head 24 will be returned to the position seen in FIGURES 8 and 9. Hook-like members 36 will now be shifted from the position seen in FIGURES 8 and 9 to the position seen in FIGURE 10, wherein their lower ends engage in annular grooves 11.1 formed in respective rolls 11. Head 24 may now be elevated to the position seen in FIGURE 11, withdrawing the rolls 11 from respective mill shafts 12 and over the pins 23. Although not shown, pins 23 may carry keys, corresponding to the keys 12.1 of the mill shafts 12, with which corresponding keyways formed in the rolls 11 are engageable. The use of such keys in the pins 23, however, is not believed necessary to retain the rolls against rotational displacement while disposed on such pins since the pressure exerted on the supported rolls by the springs 28, should be adequate to prevent such displacement.

With the rolls 11 now supported on the carriage pins 23 as seen in FIGURE 11, the carriage will be returned to the position seen in FIGURE 1 and, assuming the cart 18 to be so positioned that its spindles 20 align with respective carriage pins 23, head 24 will be lowered to the position seen in FIGURE 12 wherein the rolls are positioned on respective cart spindles. Preferably, spindles 20 have keys 20.1 which align with the keyways formed in respective rolls to insure their retention in precisely the same rotational position they were in when removed from the mill shafts 12.

Hook-like members 36 will once again be pivoted to release respective rolls 11, and the head 24 will be elevated to the position seen in FIGURE 13. Cart 18, now containing the rolls 11 removed from the mill, may be shifted along the rails 19 and another cart 118 (see FIGURE 14), identical to cart 18 but mounting replacement rolls 111, will be positioned beneath the carriage 22 with its spindles aligned with respective carriage pins 23. Replacement rolls 111, of course, will be oriented on the spindles of cart 118 in the identical manner as are the just-removed rolls 11 on the spindles of cart 18.

With the cart 118 properly positioned beneath the carriage 22, the latter's head 24 will be lowered, members 36 will be pivoted to engagement with respective rolls, and the head again elevated to lift the rolls 111 from the cart 118. Carriage 22 will now be traversed along the rails 21 to position above the mill 10 once again. The head 24 will now be lowered to slide the rolls 111 onto the respective mill shafts 12. It will be noted that since the mill shafts 12 along with the rolls 111 are identically oriented, the keyways in the rolls will accurately align with respective shaft keys 12.1. Upon disposition of the replacement rolls 111 on the mill shafts, hook-like members 26 will be pivoted to disengage respective rolls whereupon the head 24 may be elevated to leave the rolls on the mill shafts.

At this time, the previously removed, apertured washers 46 and the slotted washers 45 (FIGURE 5) will be re-installed under each shaft capscrew 37, which, it will be recalled, are partially unscrewed from respective mill shafts. With the washers once again in position, head 24 will be lowered to engage the bolt heads with the sockets 31 (FIGURE 9) as previously described. Selector switch 41 will now be positioned as seen in full lines in FIGURE 6 to close the tightening circuit 40 and the start switch 42 will be closed to energize motor M to cause rotation of the mill shafts 12 in a direction to tighten the capscrews 37 which, it will be recalled, are yieldably being held against rotation by the shafts 33 and the clutch assemblies 35. Upon rotation of the mill shafts a sufficient amount to insure tightening of the capscrews, switch 42 will be released to de-energize motor M. Carriage 24 will once again be elevated and the carriage returned to the position seen in FIGURE 1 thereby leaving the mill ready to operate with the replacement rolls 111 mounted thereon.

It is to be understood that during rotation aforesaid of the mill shafts 12 in a direction to tighten the capscrews 37, the clutch assemblies 35 function as overload devices; i.e., they will prevent rotation of the shaft 33, the socket 31 and thus the engaged capscrews 37 until a predetermined torque is reached and thereafter they will slip to allow rotation of the capscrews to prevent excess tightening thereof.

In the embodiment thus for described, the rolls 11, 111 are keyed to the mill shafts 12 to insure unitary rotation therewith. In the embodiment fragmentarily seen in FIGURE 15, however, wherein similar parts are identified by the same reference characters as before but with the suffix "a" added, the unitary rotation function is provided by screw-threading the rolls 11a on the mill shafts 12a. As herein disclosed, each mill shaft 12a may carry external screw threads 45 cooperable with internal screw threads 46 formed in respective rolls 11a, it being understood that the direction of advance of the threads 45 will be such that normal operation of the mill will tend to tighten the rolls on respective shafts. Accordingly, since certain of the mill shafts rotate in one direction during normal mill operation while other mill shafts rotate in the opposite direction, certain of the shaft threads 45 will be right-hand threads while others will be left-hand threads.

With the omission of the previously described capscrew and washers for retaining the rolls 11 on the mill shafts, the previously described socket 31, tubular member 30, shaft 33 and other associated parts are omitted, thus simplifying the structure. On the other hand, the pins 23a, instead of being anchored in the carriage, are rotatably carried thereby. Rotation of the pins 23a, however, is restricted by respective clutch assemblies similar to the previously described clutch assemblies 35. Sleeves 26a also differ slightly from those previously described in that their lower flanges 26.1a carry depending pins 47 receivable within apertures 47.1 formed in respective rolls 11a.

When the rolls 11a are to be removed from respective mill shafts 12a, sleeves 26a will be lowered to abutment with the rolls by lowering of the carriage head as previously described. The hook-like members corresponding to the members 26 previously described will then be pivoted to engage in respective roll grooves 11.1a. Rotation of the roll shafts 12a in the proper direction will then unscrew the rolls from the shafts and cause them to slide up onto the pins 23a, it being understood that the rolls will be held against rotation by engagement of the sleeve pins 47 with respective rolls and by retention of the pins 23a against rotation by the clutch assemblies (not shown). When the rolls have been completely unscrewed from respective mill shafts the carriage head will be fully elevated as before to permit carriage traverse to position wherein the rolls may be deposited on a roll storage cart.

When the rolls 11a, or replacement rolls, are to be installed on the mill shafts, the foregoing operations will be reversed, it being understood that the mill shafts will be rotated in the opposite direction from before to screw the rolls onto respective shafts. Also, in this direction of rotation, the clutch assemblies retaining pins 23a against rotation will function as overload devices to limit, to a predetermined value, the torque applied in tightening the rolls on respective mill shafts.

In the embodiments thus far described, the mill 10 has been shown as having its shafts vertically disposed; however, the invention is equally applicable to mills having horizontally disposed shafts. As seen in FIGURE 16 wherein similar parts are identified with the same reference characters as before but with the suffix "b" added, there is shown a mill 10b mounting rolls 11b supported for rotation about horizontal axes. Similarly, the roll carts 18b, 118b have their roll supporting spindles 20b projecting horizontally toward the mill 10b.

Carriage 22b, in this embodiment is pivoted about an axis 47 from the full-line position adjacent the mill 10b to the phantom-line position adjacent the roll storage carts 18b, 118b. As before, carriage 22b carries pins 23b for alignment with respective mill shafts and respective cart spindles; however, pins 23b, of course, extend horizontally rather than vertically. Carriage 22b also has a head 24b and associated parts which function in the same manner as previously described to shift the rolls 11b toward and away from the mill 10b and the roll storage carts 18b, 118b.

In view of the foregoing it will be apparent to those skilled in the art that we have accomplished at least the principal object of our invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim:

1. For use with apparatus having a plurality of rotatable spindles arranged in laterally spaced relation and mounting respective working rolls which must be replaced with minimum interruption of operation of such apparatus, the method which comprises storing a set of replacement rolls remote from said apparatus spindles and in the same spaced relation thereas, shifting a roll transfer device adjacent said stored set of replacement rolls, transferring the rolls of said replacement roll set en masse to said transfer device, shifting said transfer device adjacent said apparatus spindles, and transferring said replacement rolls en masse from said transfer device to respective apparatus spindles.

2. For use with apparatus having a plurality of rotatable spindles arranged in laterally spaced relation and mounting respective working rolls which must be replaced with minimum interruption of operation of such apparatus, the method which comprises storing a set of replacement rolls remote from said apparatus spindles and in the same spaced relation thereas, shifting a roll transfer device adjacent said apparatus spindles, transferring said working rolls en masse from respective spindles to said transfer device, shifting said transfer device to a place remote from said apparatus spindles, removing said working rolls en masse from said transfer device and storing such rolls in the same spaced relation as said apparatus spindles for subsequent reassembly of such rolls with said spindles, effecting relative movement between said stored set of replacement rolls and said transfer device to dispose the latter adjacent the former, transferring the rolls of said replacement rolls set en masse to said transfer device, shifting said transfer device adjacent said apparatus spindles, and transferring said replacement rolls en masse from said transfer device to respective apparatus spindles.

3. The method of claim 2, wherein said roll transfer device is shiftable between a first position adjacent said apparatus spindles and a second position remote from such spindles, and wherein a stored roll set is shifted adjacent said roll transfer device second position prior to transfer of such roll set to said roll transfer device.

4. In combination: apparatus having a plurality of rotatable spindles arranged in laterally spaced relation, working rolls mounted on respective spindles, a roll transfer carriage engageable with respective working rolls, means for shifting said roll transfer carriage toward and away from position adjacent said apparatus spindles, and means for shifting the rolls engaged by said carriage from position on respective spindles to position supported by said carriage.

5. The construction of claim 4 wherein said working rolls have screw-threaded engagement with respective spindles, wherein said roll transfer carriage has portions engageable with respective working rolls to restrict rotation thereof, wherein said carriage spindles are rotatable in one direction while said carriage portions are engaged with respective rolls to release the latter from respective spindles, and wherein said carriage spindles are rotatable in the opposite direction while said carriage portions are engaged with respective rolls to secure the latter to respective spindles.

6. The construction of claim 5 wherein each roll is provided with an annular groove and wherein said roll transfer carriage carries roll gripping means movable toward and away from position within respective roll grooves aforesaid.

7. The construction of claim 4 wherein said roll transfer carriage carries roll gripping means movable toward and away from gripping engagement with respective rolls.

8. The construction of claim 4 wherein a pair of roll storage areas are provided, each adapted to receive and store a set of rolls in the same laterally spaced relation as said apparatus spindles, wherein said shifting means effects movement of said roll transfer carriage in a direction to transfer a set of rolls en masse from positions on said apparatus spindles to one of said roll storage areas, and wherein said shifting means effects movement of said roll transfer carriage in a direction to transfer another set of rolls en masse from the other roll storage area to positions on said apparatus spindles.

9. The construction of claim 8 wherein said roll transfer carriage is shiftable between a first position adjacent said apparatus spindles and a second position spaced from such spindles, and wherein each roll storage area is provided by a roll storage carriage selectively shiftable toward and away from cooperable relation with said roll transfer carriage upon disposition of the latter in its second position aforesaid.

10. The construction of claim 9 wherein each roll and its respective apparatus spindle have interengageable portions to insure against relative rotation therebetween, wherein means are provided for terminating rotation of each apparatus spindle aforesaid in a predetermined rotational position prior to removal of said rolls therefrom, and wherein each roll storage carriage is cooperable with each roll aforesaid for storage thereof in the same predetermined rotational position as respective spindles aforesaid.

References Cited
UNITED STATES PATENTS

| | | | |
|---|---|---|---|
| 2,829,697 | 4/1958 | Rockhoff et al. | 72—239 |
| 2,011,686 | 8/1935 | Mikaelson et al. | 72—239 |
| 3,221,530 | 12/1965 | Swallow et al. | 72—239 |

CHARLES W. LANHAM, *Primary Examiner.*

A. RUDERMAN, *Assistant Examiner.*